(No Model.) 7 Sheets—Sheet 3.
E. A. WALKER.
BALING MACHINE.
No. 485,824. Patented Nov. 8, 1892.
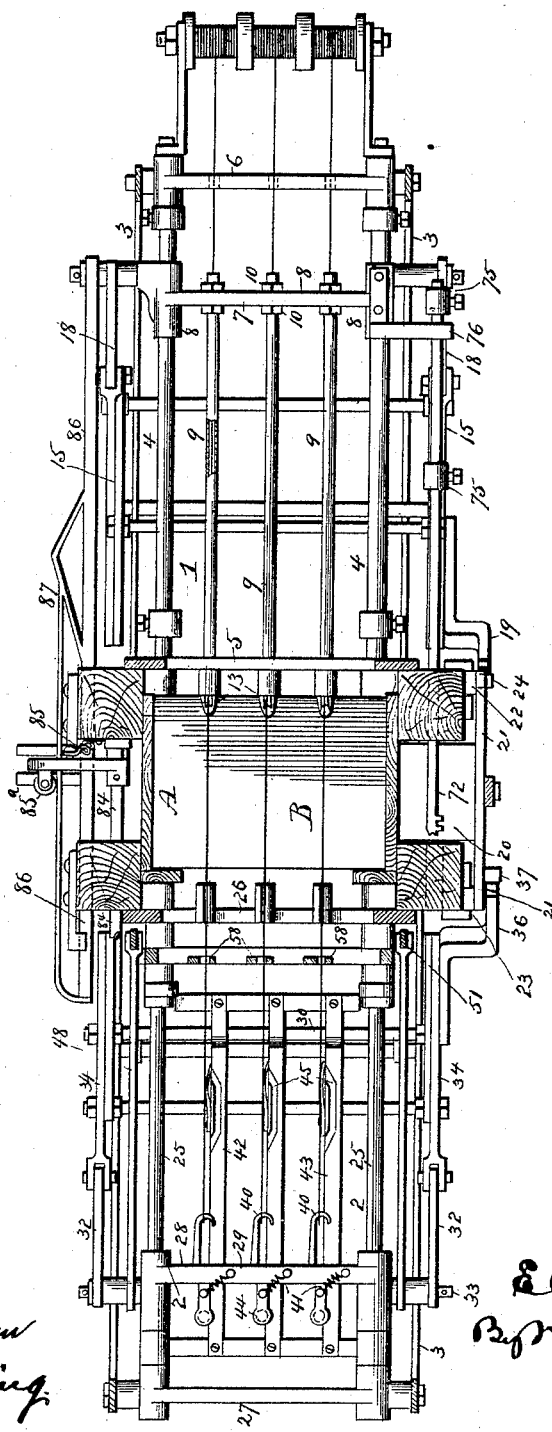
Witnesses
Inventor
E. A. Walker.
Attorney

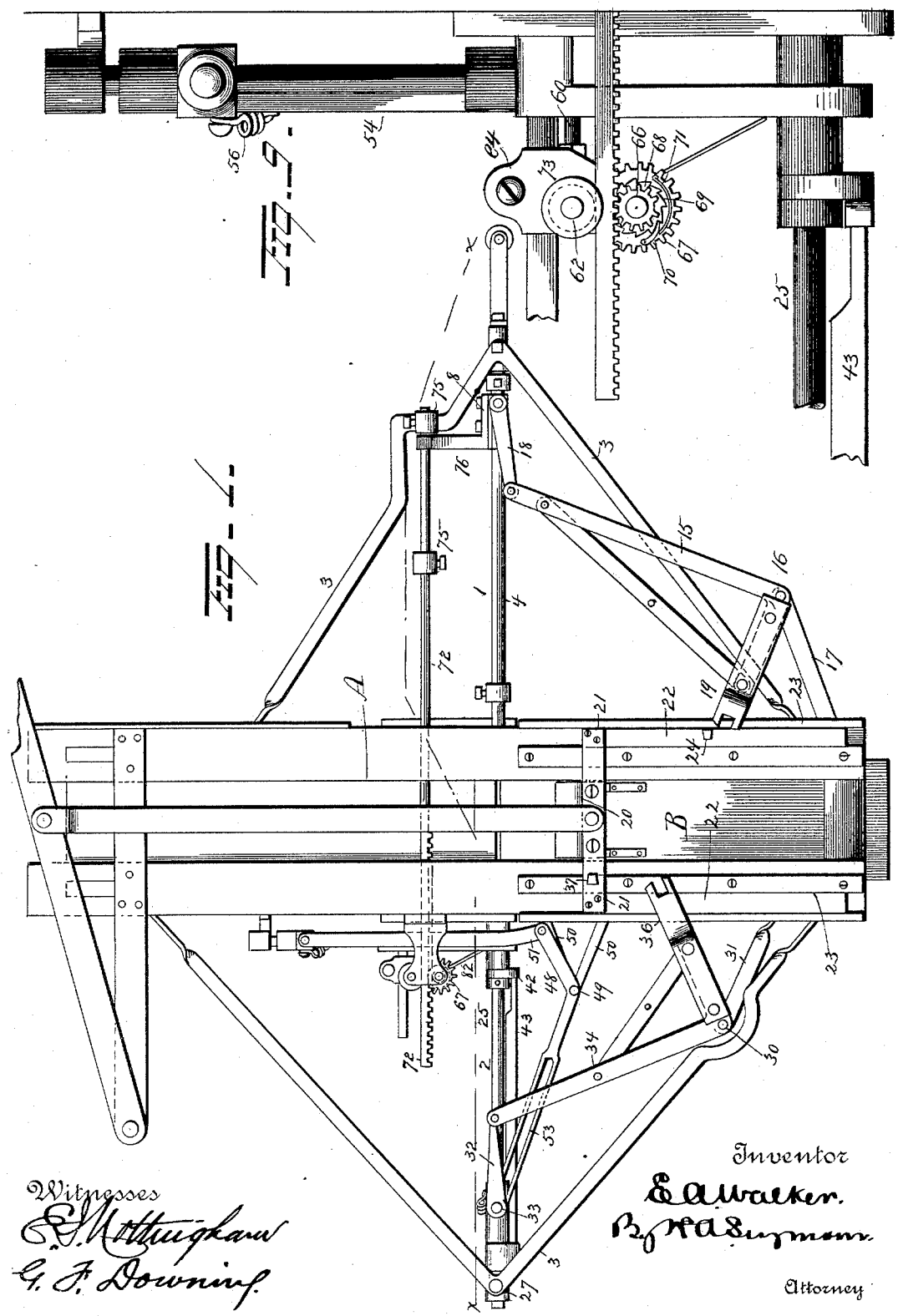

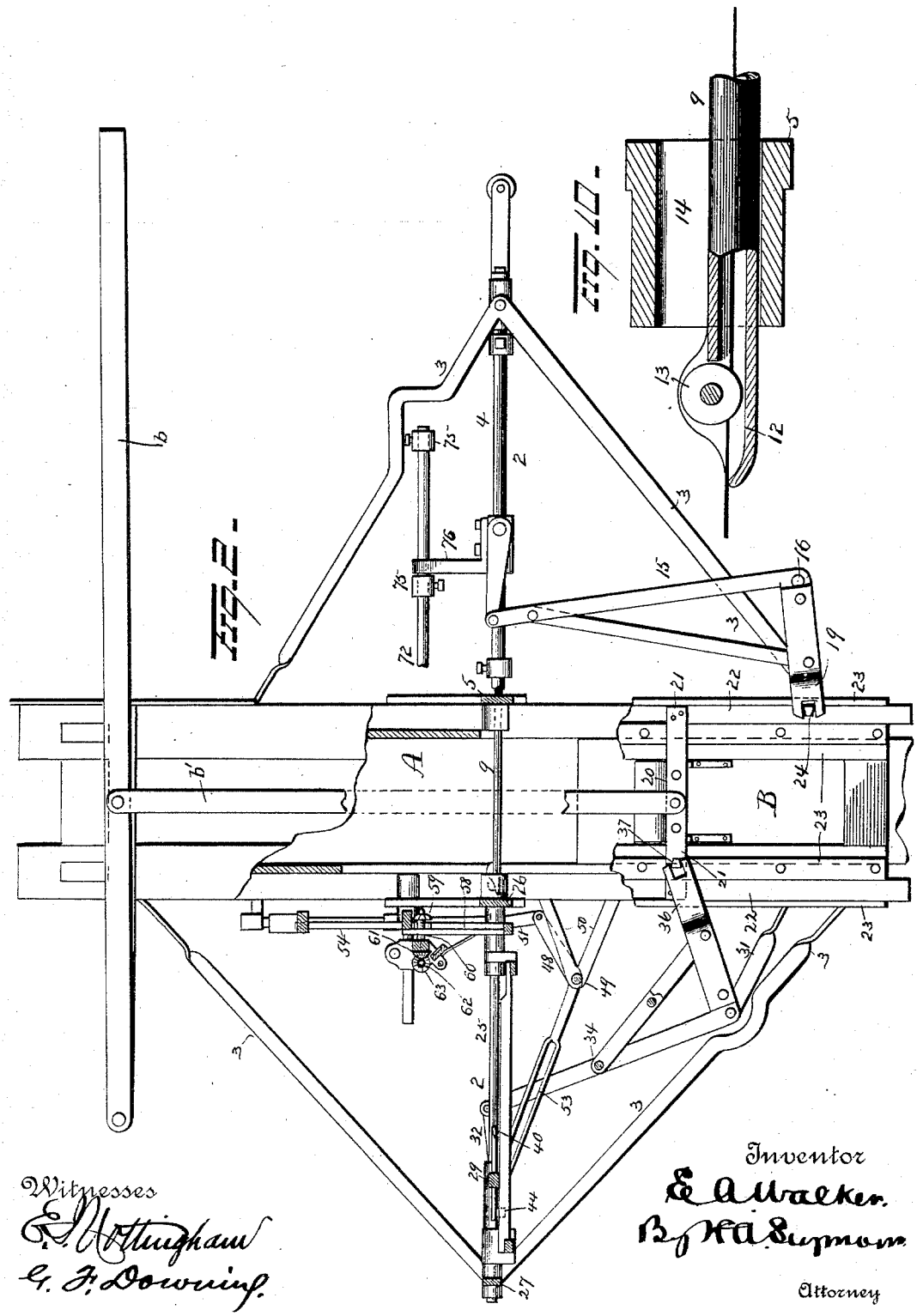

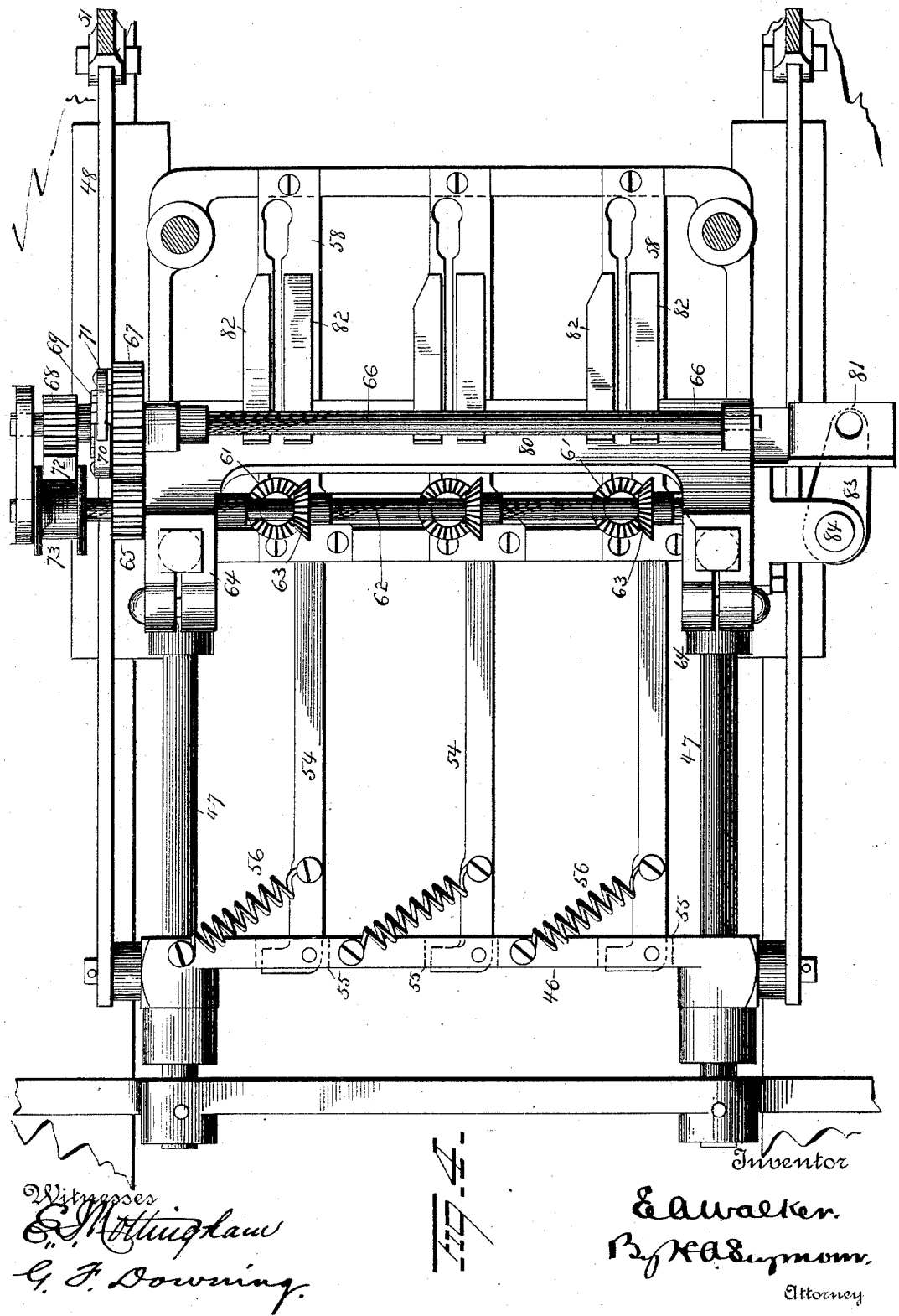

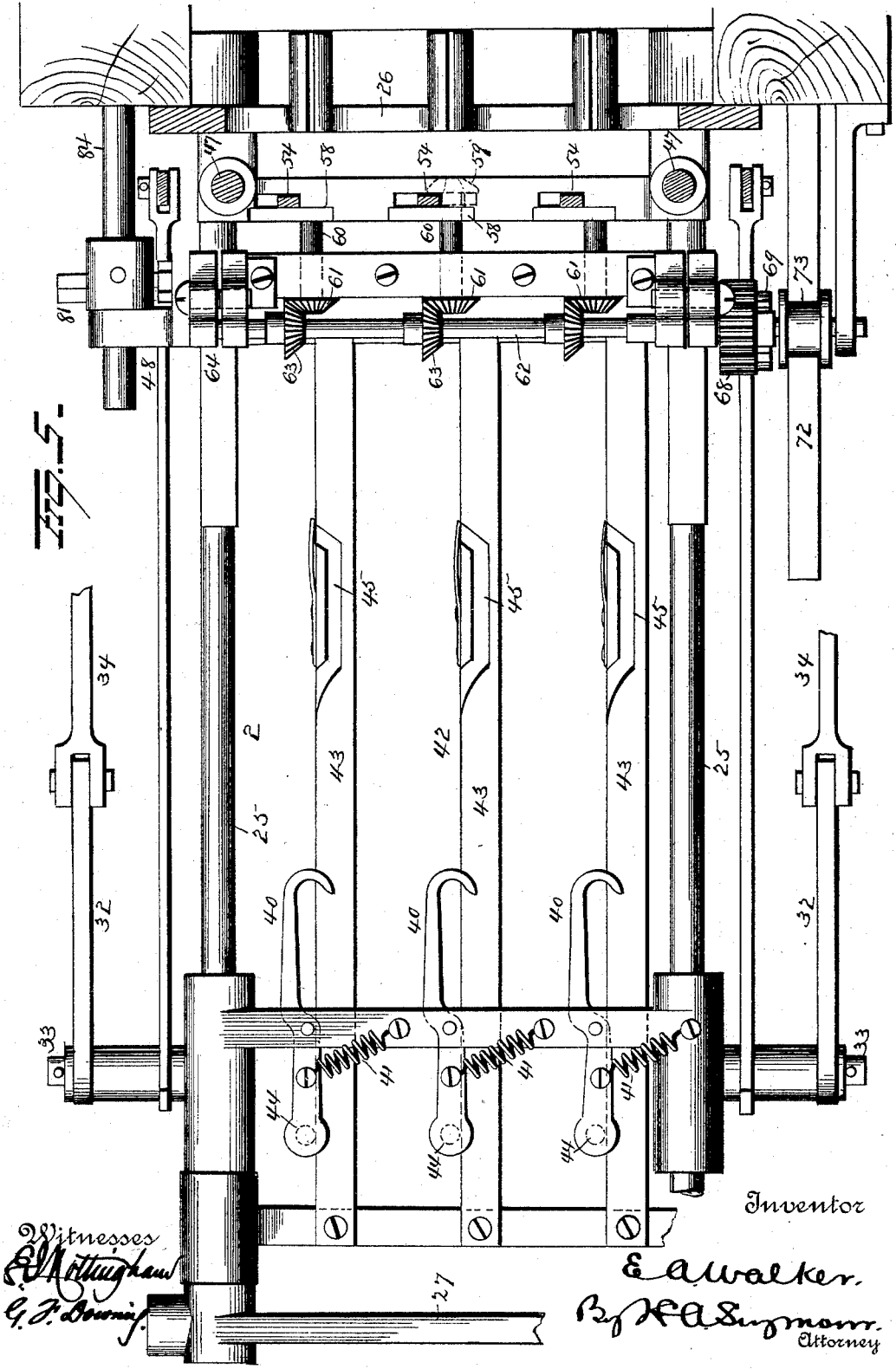

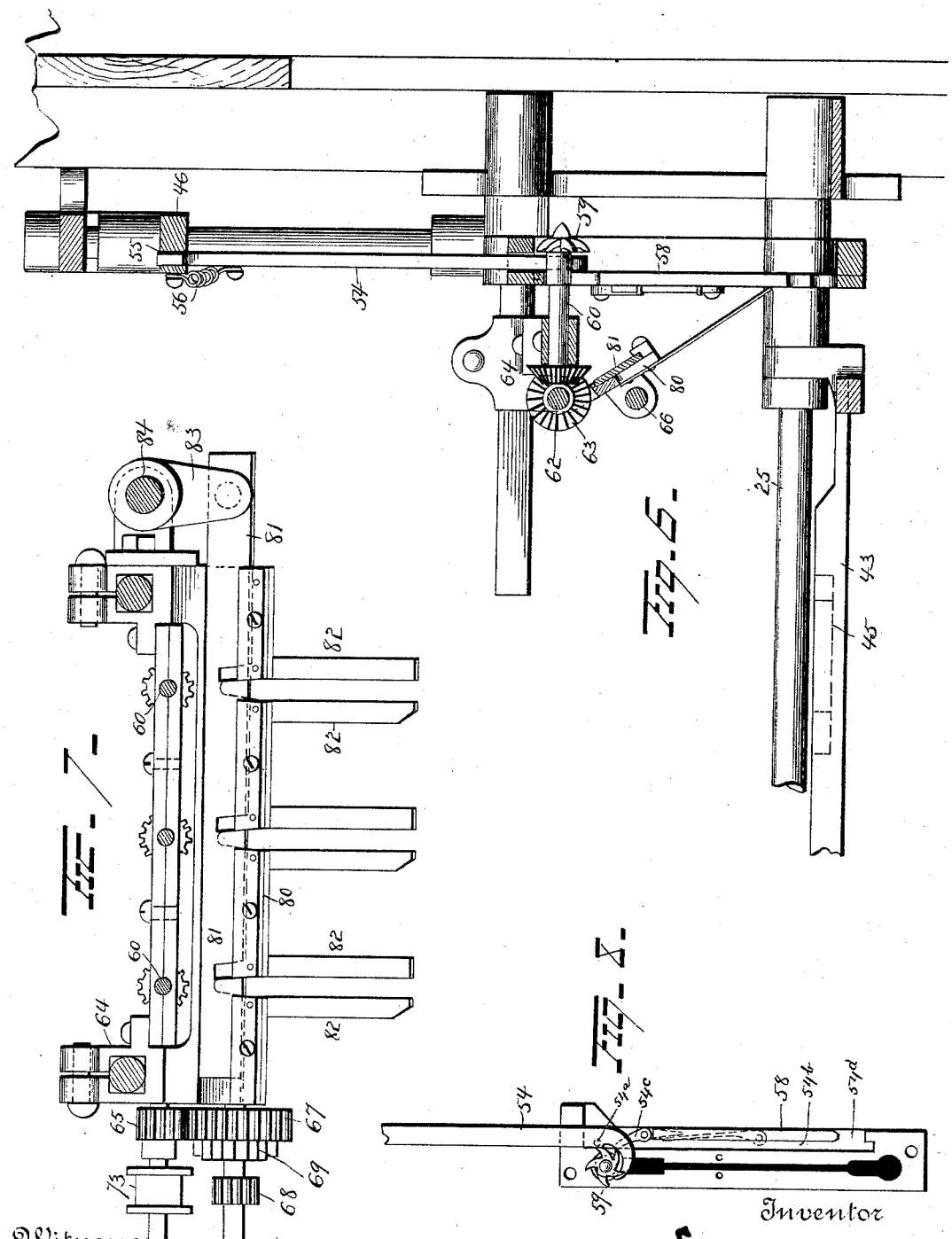

(No Model.) 7 Sheets—Sheet 7.
E. A. WALKER.
BALING MACHINE.
No. 485,824. Patented Nov. 8, 1892.
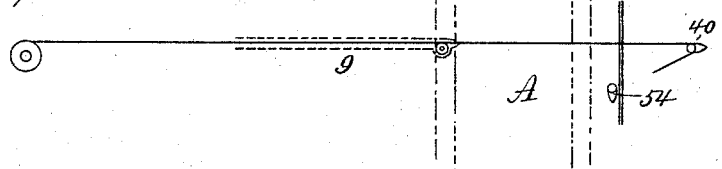
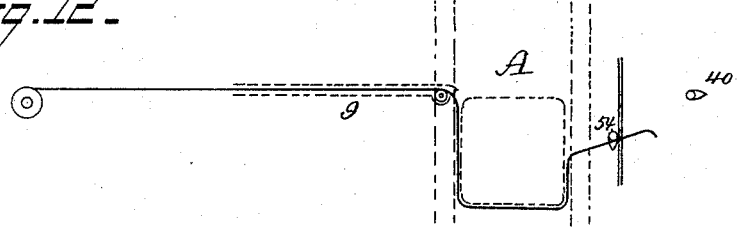
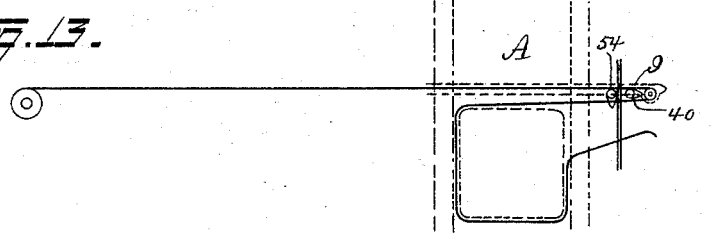
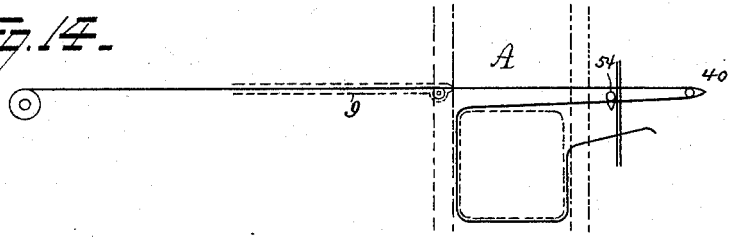
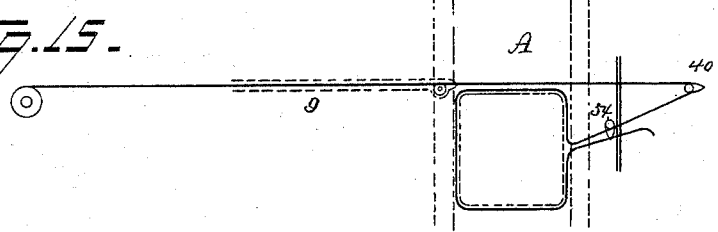
Witnesses
G. Nottingham
G. F. Downing
Inventor
E. A. Walker
By H. A. Seymour
Attorney

UNITED STATES PATENT OFFICE.

EDWARD A. WALKER, OF CANAJOHARIE, NEW YORK.

BALING-MACHINE.

SPECIFICATION forming part of Letters Patent No. 485,824, dated November 8, 1892.

Application filed August 22, 1891. Serial No. 403,466. (No model.)

*To all whom it may concern:*

Be it known that I, EDWARD A. WALKER, of Canajoharie, in the county of Montgomery and State of New York, have invented certain new and useful Improvements in Baling-Machines; and I do hereby declare the following to be a full, clear, and exact description of the invention, such as will enable others skilled in the art to which it appertains to make and use the same.

My invention relates to an improvement in baling-machines; and it consists in certain novel features of construction and combinations of parts, as will hereinafter be described, and pointed out in the claims.

In the accompanying drawings, Figure 1 is a plan view of my baling-machine. Fig. 2 is a similar view, partly in section, showing the needles carried across the baling-chamber. Fig. 3 is a sectional view on line $x\,x$ of Fig. 1. Figs. 4, 5, 6, 7, 8, 9, and 10 are enlarged detached views of parts of my baling-machine. Figs. 11, 12, 13, 14, and 15 are views showing the different positions taken by the needles and primary and secondary hooks in passing the wires around the bale.

A represents the bale-chamber of the machine, and B is the plunger, fitted to and operating in this chamber. The plunger is operated in the usual manner and is adapted to reciprocate at the required speed to compress the material being baled in the bale-chamber. As a means simply to demonstrate the *modus operandi*, I have shown a hand-lever $b$ connected by pitman $b'$ to the plunger, so that by swinging the lever back and forth the plunger may be reciprocated. This of course is not practicable for actual use, and steam or water power would generally be used. The hay, straw, or other material is fed in, preferably, through the top of the bale-chamber and forced forward and bound at the required time.

On each side of the bale-chamber guide-frames 1 and 2 are secured, these being held firmly in place in alignment with each other by means of braces 3 3, which conveniently extend from their outer ends to the sides of the bale-chamber. These two frames are substantially alike; but as they differ in some respects they will be described separately, and, first, frame 1, which, for convenience, may be designated the "needle-frame," comprises, preferably, a pair of guide-rods 4 4, extending at right angles from the bale-chamber and from a plate 5, secured to the side of the latter, to the cross-bar 6 at the outer end of the frame, and to the ends of which the braces 3 are secured. A needle-carrier 7 is mounted on these guide-rods and constructed to reciprocate thereon as occasion requires it. This carrier comprises a head 8, the ends being cored out to receive the guide-rods and needles 9 9 of tubing. Said needles are screw-threaded at their butt ends for a short distance where they enter the head 8, and they are adjustably held in the head by means of jam-nuts 10 10 on either side of the head. The nuts are screwed backward or forward the proper distance to effect the exact adjustment of the needles endwise, and they are then screwed up tight against the head. At their opposite or free ends these needles are slightly pointed to facilitate their passage through the material, and the openings 12 12 for the wire to pass out through are usually on the rear side of the pointed ends, as shown, and on the same side a small roller 13 is located, over which the wire is paid out. These ends of the needles pass loosely through slots 14 14, formed in the plate 5, formed for the purpose.

The needle-carrier may be operated by any approved mechanism, and I have devised the following as simple and practicable: Bell-crank levers 15 15 are fulcrumed by means of a rod 16 in the brackets 17 17 to one side of the bale chamber. The long arms of these levers are connected by means of short links 18 18 with the head 8, and the short arm of one of the levers is provided with a tappet-arm 19. The latter is notched at its free end and beveled at each side of the notch. The plunger B is provided with a cross-head 20, and from the latter the arms 21 21 extend out laterally in opposite directions. These arms are connected with slides 22 22, which pass through guides 23 23. On one of these slides a lug 34 is secured, the same being adapted to strike the tappet-arm 19 to vibrate the latter and reciprocate the needle-carrier. The lug is adapted to enter the notch in the end of the tappet-arm, and thus carry the arm forward until it passes out of the notch. The corners of the arm 19 are beveled to allow the lug to pass by them in its passage to the notch, the points of the arm projecting outward far enough to be struck by the lug. Located on the opposite side of the bale-chamber is the other guide-frame 2. This frame comprises guide-rods 25 25, held apart at their inner ends by the plate 26, secured to the side of the bale-chamber, and by the bar 27 at their outer ends, and to the latter the braces are secured. A reciprocating hook-carrier 28 is arranged to slide on this frame 2. It consists of a head 29, cored at its ends to receive the guide-rods 25 25. This hook-carrier is reciprocated very much as the needle-carrier is—that is to say, bell-crank levers 34 34 are secured on a rocking rod 30, fulcrumed in brackets 31 31 on the side of the bale-chamber. The long arms of each of these bell-crank levers is connected by link 32 with the bearing pins 33 33 on ends of head 29, and one of the short arms is provided with notched tappet-arm 36, like arm 19 and for the same purpose, and this arm is actuated by a lug 37 on cross-head 20, the sole object of these hook-carriers being to take the wires from the hooks in laying them across the bale-chamber, and the operation of the needle-carrier and the hook-carrier is such that while the former is started before the latter it has a greater distance to travel, and the hooks and needles meet, finally, on the hook side of the bale-chamber, the hooks approaching and grasping the wires after the needles have stopped at their extreme inward position. These hooks 40 40 are pivoted to the hook-carriers and held yieldingly in position by the spiral springs 41 41, and they hold the wire, which is bent around them, simply by the resistance of the wire to straightening out.

A rigid frame 42, composed of parallel bars 43 44, is located to one side of the hook-carrier, and the hooks are each provided with a lateral pin 44, which bears on the lower edges of the bars. The lower edges of these bars being straight, the hooks maintain a horizontal position until they reach the cam-grooves 45 in the bars, where the pins are forced by the tension of the springs, the object being to depress the hooks, so they will fall into position to grip the wires from the needles to hold them on that side of the bale-chamber while the bale is being formed. A spring $45^a$ is adapted to drop over the inner end of the groove 45. This is pushed aside by the pin on the hook in passing out of the groove, but bridges over the end of the groove and prevents the pin from dropping into the groove on its return. The wires are held at this point by the resistance of the wire to straightening, a supply always being paid out freely from the spools through the needles as fast as it is required.

In addition to the mechanism just described for laying the wire in position to surround the bale means are provided for fastening the wires around the bale and cutting the wires. These will now be described. A secondary-hook frame 46 is constructed to slide back and forth on the stationary guide-frame 47. This hook-frame is reciprocated at right angles to the primary-hook frame, previously described, by the following mechanism: Bell-crank levers 48 48 are secured to a rod 49 at their bends, and the rod is supported in brackets 50 50. The short arms of these levers are connected by pitmen 51 51 with the hook-frame 46, and the long arms are provided with elongated slots 53 53, which receive the bearing-pins 33 33, with which the levers have sliding connection. So it will be seen from this arrangement of parts that the primary and secondary hook frames move simultaneously, and the movement of the latter is dependent on the movement of the first. The pivoted hooks 54 54 in the secondary frame extend through vertical slots 55 55 in the frame, and they are held yieldingly in position by the spiral springs 56 56. As the primary-hook frame moves onward the secondary-hook frame also moves inward and its hooks drop beneath the wires which are located in the slotted plates 58 58. To this end the secondary hooks 54 54 are provided on their inner faces with a pin $54^a$. In line with the normal path of these pins grooves $54^b$ are formed in the slotted plates; but to throw the hook outward out of the way of the slot in the plate a spring-actuated switch $54^c$ normally closes the end of the groove adjacent to the twister. The pin $54^a$, striking this switch, rides over it against the action of spring 56, and in the outward movement of these secondary hooks their pins $54^a$ travel along the edge of the plate until they reach the opening $54^d$ in the grooves, when they drop into said grooves, due to the tensile action of springs 56 in that direction. When this motion takes place, two of the strands of wire are caught by the secondary hooks, the third strand being inside of the needles, where it cannot be caught by the hook, which needle is out of the reach of the secondary hook, as Fig. 8 will indicate. Then when the secondary hook-frame recedes, the pins $54^a$ pushing aside the switches $54^c$, the hooks gather the two ends of the wires and convey them back to the twisters 59 59, where they are twisted securely together. These twisters are located on the inner ends of the spindles 60 60, and on the outer ends of the latter the bevel pinions 61 61 are secured. A shaft 62, having a corresponding number of bevel-pinions 63 63 and meshed with pinions 61 61, is revolubly supported in a frame 64, and this shaft is provided on its upper end with pinion 65. Another shaft 66, having a pinion 67 thereon, is located beside shaft 62, and this pinion 67 is meshed with pinion 65. The shaft 66 has a smaller pinion 68 thereon, through which the shaft is actuated. On the hub of the latter a ratchet-toothed wheel 69 is formed, and a pawl 70 on the large pinion 67 is held yieldingly in engagement with the ratchetteeth by a spring 71. A reciprocating rack-bar 72 passes between pinion 65 and roller 73, and as it passes outward it rotates the pinion 65 and its shaft in one direction, and as it slides in the opposite direction it rotates the pinion in the opposite direction and with it pinion 67, which imparts motion to shaft 62, and hence to the twisters. The rack-bar has two adjustable collars 75 75 set thereon, and an arm 76 on the needle-carrier operates between these collars to reciprocate the rack-bar as the needle-carrier is operated. The collars on the rack-bar may be set at different positions apart; but they are preferably located as shown in the drawings, so that the needle-carrier reciprocates some distance before the rack-bar is moved.

In addition to the parts described a cutting mechanism is provided. On the frame 64 a notch-plate 80 is secured, and in the latter a notched blade 81 slides. Plates 82 82 guide the wires into the notches of the plate 80, and the blade 81 by moving up and down severs the wire. Said blade is reciprocated by the following means: The lower end of the blade is pivotally connected to an arm 83 on the rock-shaft 84, so that as the latter is rocked the blade is moved up and down. A cam-lever is secured on the rock-shaft and held yieldingly in its normal position by a stiff spring 85. This lever conveniently has a roller 85$^a$ thereon. A reciprocating rod 86, with a cam 87 thereon, is connected with the needle-carrier, and this cam by sliding against the roller 85$^a$ rocks the lever, and consequently the rock-shaft, and thus moves the blade of the shearing apparatus. The operation is briefly as follows: Before the machine is started the wires are drawn loosely across the bale-chamber and their ends are bent around the primary hooks, where they are held by the resistance of the wires to straighten out again. The parts are normally in the position shown in Fig. 11. Power is then applied in any convenient manner to the plunger and the latter is reciprocated while the hay or other material to be baled is being fed to the machine. This continues until the bale has reached the desired size, as shown in Fig. 12, when the tappet 36 is struck by the plunger. This has the effect of forcing the needle-frame forward until the needles cross the bale-chamber and carry the wires across the adjacent end of the bale, as shown in Fig. 13. The tappet 19, connected with the primary hook-frame, is also struck, so that the latter is forced inward until the hooks meet the free ends of the needles and catch the wires. The plunger has by this time reached its extreme throw, and reversing its movement, the tappets are swung in the opposite direction, thus causing the needles and primary hooks to move outward or to resume their normal positions again, as shown in Fig. 14, during which movement wires are stretched, as shown, for a new bale. Prior to the outward movement of the needles and primary hooks the secondary hooks have caught the two strands of wire outside of each needle, as previously explained, and as the needles and primary hooks assume their normal positions the secondary hooks retreat with the wires to the twisters, in contact with which they are held until securely twisted together. During this motion the blade of the cutters is reciprocated and the wires are cut. This completes the operation of forming one bale, it being repeated as often as material enough accumulates to form a new bale.

Having fully described my invention, what I claim as new, and desire to secure by Letters Patent, is—

1. In a baling-press, the combination, with a bale-chamber and reciprocating plunger, of reciprocating needles constructed and arranged to cross the bale-chamber and carry wires around the bale formed therein and reciprocating hooks adapted to advance and receive the wires from the needles and assist the latter in holding the wires across the bale-chamber, substantially as set forth.

2. The combination, with a bale-chamber and reciprocating plunger, of reciprocating needles constructed and arranged to cross the bale-chamber and carry wires around the bale formed therein, primary hooks arranged to receive the wires from the needles, wire-twisters, and secondary hooks adapted to grasp and carry the wires to be twisted to the twisters, substantially as set forth.

3. The combination, with a bale-chamber and plunger constructed to reciprocate therein, of reciprocating needles, primary and secondary hooks, and twisters to which the wires are carried by means of the secondary hooks, and means connected with the plunger for setting the needles, the hooks, and the twisters in motion, substantially as set forth.

4. The combination, with a bale-chamber and reciprocating plunger, of needle-frame, needles therein, a primary-hook frame, hooks, wire-twisters, and secondary hooks adapted to carry the wires to the twisters, substantially as set forth.

5. The combination, with bale-chamber and plunger, of needle-frame, hollow needles secured thereto, through which the wires pass, primary hooks, wire-twisters, secondary hooks, and means for swinging these secondary hooks to one side to grasp the wires preparatory to carrying them to the twisters, substantially as set forth.

6. The combination, with baling-chamber and plunger, of needles, wire-twisters, hooks for grasping and carrying the wires to the twisters, slotted plates through which the wires are conducted by these hooks, and switch and spring mechanism for controlling the movement of these hooks, substantially as set forth.

7. The combination, with a bale-chamber, plunger, and a needle-frame extending out at one side of the bale-chamber, of a needle-carrier, needles therein, reciprocating primary and secondary hooks, bell-crank levers connected with the latter, and tappets secured to the bell-crank levers in position to be operated by the plunger to reciprocate the needles, substantially as set forth.

8. The combination, with a bale-chamber, a plunger, a needle-frame extending in one direction from the bale-chamber, and a hook-frame in the opposite direction, needles and pivoted hooks arranged to reciprocate in these frames, levers connected with the needles, and hooks and tappets secured to the levers in position to be operated upon by the plunger, whereby to set the connected parts in motion, substantially as set forth.

9. The combination, with a bale-chamber and plunger, of reciprocating needles, a primary-hook carrier, spring-actuated hooks pivoted thereto, said hooks and needles traveling approximately in alignment with each other, twisters, secondary hooks for carrying the wires to the twisters, and cutting mechanism, substantially as set forth.

10. The combination, with bale-chamber and plunger, of reciprocating needles, reciprocating primary and secondary hooks, and means connecting both sets of hooks, whereby they are reciprocated simultaneously, substantially as set forth.

11. The combination, with a bale-chamber and plunger, of reciprocating needle-carrier having needles connected therewith, primary hooks, secondary-hook frame, secondary hooks, and slotted levers pivotally connected at one end with the secondary-hook frame and having sliding connection with the needle-carrier, substantially as set forth.

12. The combination, with a bale-chamber and plunger, of a reciprocating carrier, reciprocating needles, primary and secondary hooks, a rack-bar having loose sliding connection with the carrier, wire-twisters, and a shaft for imparting motion to the twisters, said shaft having a pinion thereon with which the teeth of the rack engage to impart motion to the twisters, substantially as set forth.

13. The combination, with a bale-chamber, reciprocating needle-carrier having needles therein, and reciprocating primary and secondary hooks, of a stationary plate having notches therein, a reciprocating blade, also provided with notches, a rock-shaft having an arm thereon pivotally connected with the blade, and a cam-lever attached also to the shaft, and a reciprocating rod secured to the carrier and having a cam thereon adapted to bear on the cam-lever when moved sufficiently, whereby to rock the shaft, substantially as set forth.

In testimony whereof I have signed this specification in the presence of two subscribing witnesses.

EDWARD A. WALKER.

Witnesses:
 DANL. S. MORREL,
 B. F. SPRAKER.